C. GODSEY.
FOLDING BAGGAGE RACK.
APPLICATION FILED JUNE 13, 1919.
1,333,206.
Patented Mar. 9, 1920.
2 SHEETS—SHEET 1.
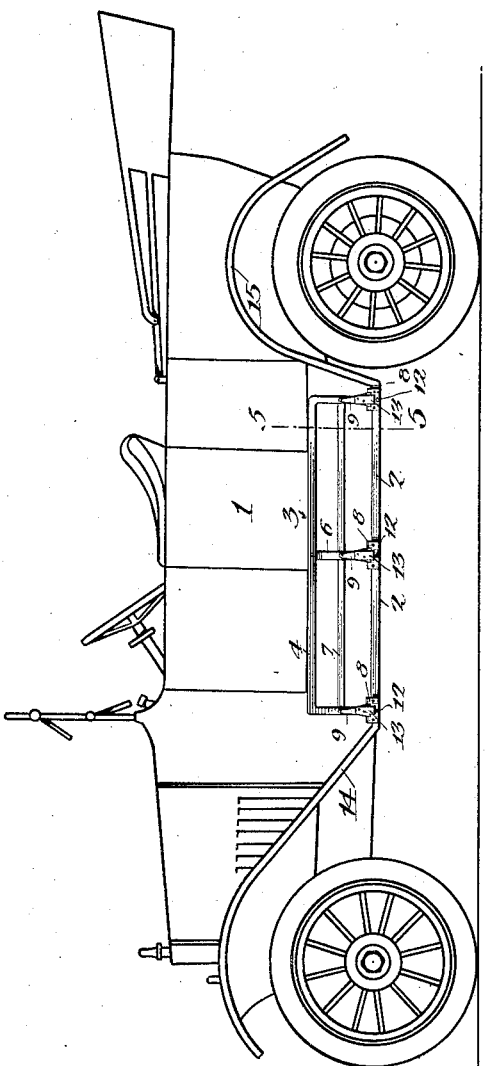
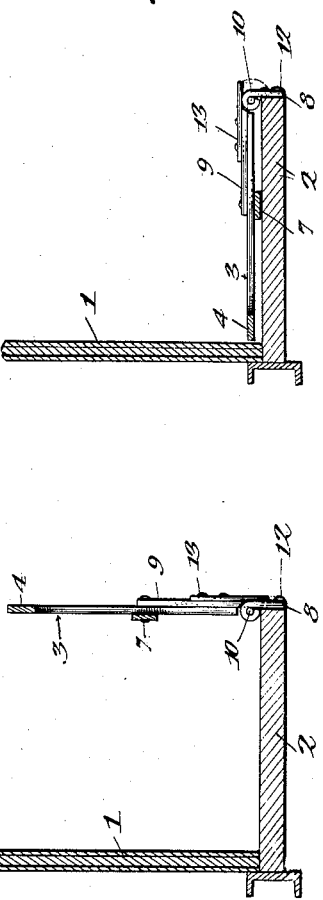
Inventor:
Cain Godsey,

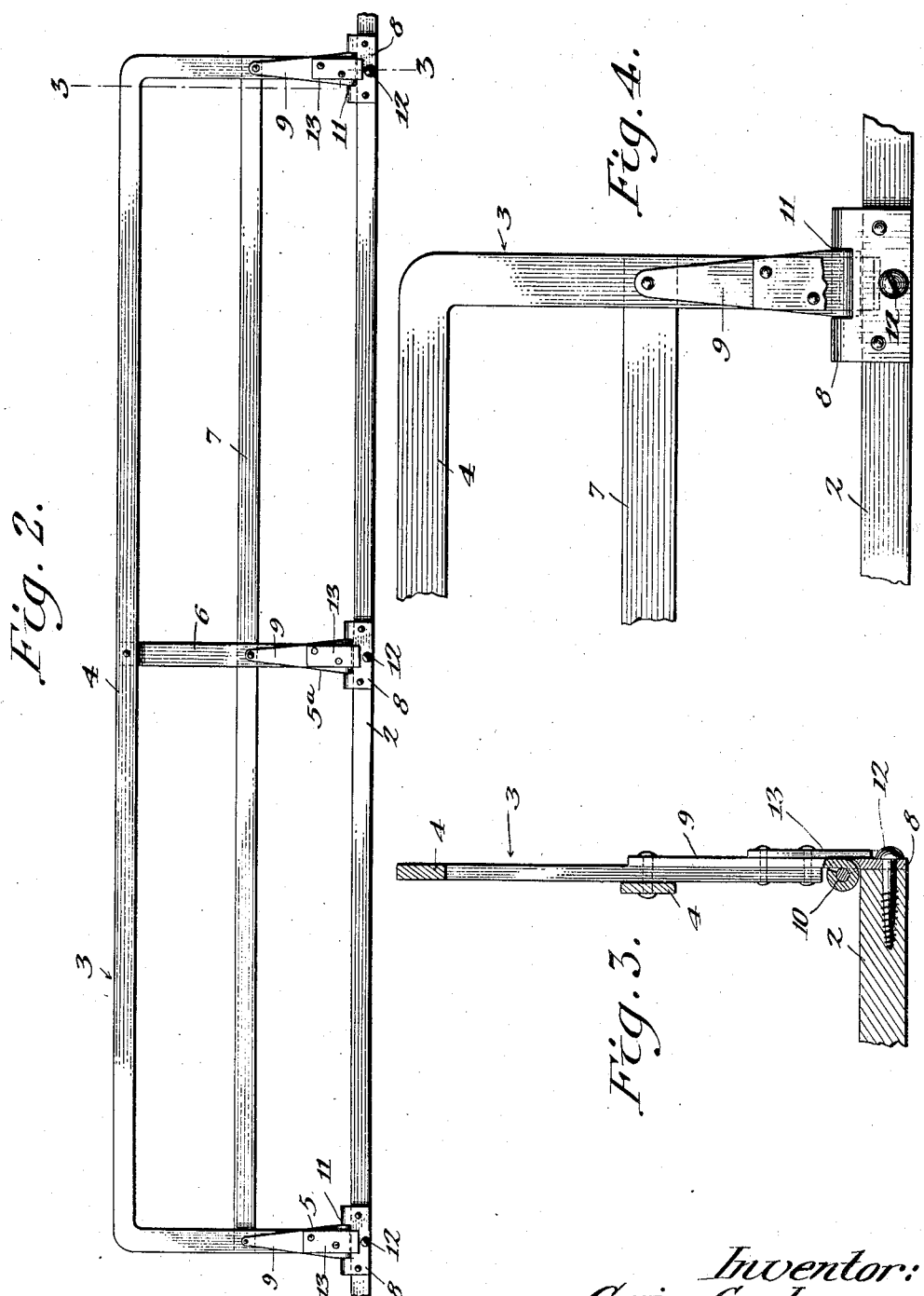

UNITED STATES PATENT OFFICE.

CAIN GODSEY, OF BRISTOL, TENNESSEE.

FOLDING BAGGAGE-RACK.

1,333,206.	Specification of Letters Patent.	Patented Mar. 9, 1920.

Application filed June 13, 1919. Serial No. 303,845.

*To all whom it may concern:*

Be it known that I, CAIN GODSEY, a citizen of the United States, residing at Bristol, in the county of Sullivan and State of Tennessee, have invented certain new and useful Improvements in Folding Baggage-Racks, of which the following is a specification, reference being had therein to the accompanying drawings.

This invention relates to a folding baggage rack for automobiles, and has for its object the construction of a rack or holder device on the running board of an automobile.

Another object of the invention is the construction of a simple and efficient rack which, when not in use, can be folded flat upon the running board of a motor vehicle, and which, when in use, will stand vertically, allowing a parcel or piece of luggage to be retained upon the running board between the rack proper and the body of the vehicle.

With these and other objects in view, my invention comprises certain novel constructions, combinations, and arrangements of parts as will be hereinafter specifically described, illustrated in the accompanying drawings, and more particularly pointed out in the appended claims.

In the drawings,

Figure 1 is a view in side elevation of a motor vehicle upon which is constructed my improved baggage rack.

Fig. 2 is an enlarged view in side elevation of the baggage rack, while

Fig. 3 is a sectional view taken on line 3—3, Fig. 2.

Fig. 4 is an enlarged, fragmentary view, in elevation, of one end of the rack.

Fig. 5 is a sectional view taken on line 5—5, Fig. 1.

Fig. 6 is a sectional view taken on line 5—5, Fig. 1, showing the frame of the rack folded down upon the running board.

Referring to the drawings by numerals, 1 designates the body of the automobile, and 2 the running board thereof.

The hinged frame 3 comprises a substantially inverted U-shaped body 4, having at its lower ends hinges 5, 5, and the body 4 is provided with a central brace 6; a longitudinally-extending slat 7 connects the ends of the body 4 and the central brace 6. Attached to the inner or lower end of brace 6 is a central hinge 5ª.

Each hinge 5 and 5ª comprises a base or primary leaf 8 and a comparatively long auxiliary leaf 9; these leaves 8 and 9 are hinged together by pin 10. The primary leaf 8 is bifurcated at 11 for receiving the lower end of the auxiliary leaf 9, and the leaves are rolled at their meeting edges (Fig. 3) for producing suitable means for receiving the pin 10.

Suitable fastening means, as screws 12, extend through the primary leaves 8 and into the running board 2, fastening the hinges in a vertical position to the outer edge of the running board.

To prevent the hinged frame 3 from tilting too far outward, plates 13 are fastened to the auxiliary leaves 9, and each plate projects downwardly sufficiently to engage the outer face of the primary leaf, when the rack is in its normal open or vertical position (Figs. 1 to 5). These plates perform the function of a "stop" and are efficient in operation, as a too-far bending of the hinged frame 3 outwardly would cause the lower ends of the stop-plates 13 to bear against the screws 12 (Fig. 3), whereby the screws act directly upon the plates 13 to remove strain off the fastening means and the plates to a considerable extent, thereby increasing the durability of the entire device; it is to be noted that the screws 12 are placed directly under the stop plates 13, and as the plates 13 have a slight resiliency, they will, under strain, permit a downward sliding action sufficient for their lower ends to engage the screws 12, and thereby stop or prevent farther outwardly swinging of the hinged frame 3 upon the running board when it has been moved to its open position.

When the baggage rack is not in use, the frame 3 is folded down upon the running board (Fig. 6) out of the way, and all the operator has to do is to move the frame upon its hinges to a vertical position, place the article or piece of baggage between the body 1 and the frame, and the article or baggage will be retained securely in place by reason of the front mud guard 14 and the rear mud guard 15 acting as a preventative at each end of the rack to keep the stored goods or articles within the rack; this is particularly true in the prevention of displacement of a club case or suit case or a bag of goods.

The comparatively long auxiliary leaves 9 perform the function of a brace for the ends of the body 4 and the central brace 6, as these leaves extend about one-half the length of the ends and also the brace.

From the foregoing description, it is to be understood that my rack includes in its combination the body of the vehicle, the running board and the hinged frame; furthermore, to produce a rack of the greatest efficiency, the combination may also legitimately include the front and rear mud guards as the end closing means of the rack structure.

In carrying out my invention, and the manufacture thereof on a large scale, I may find it necessary to make certain minor changes or alterations as shall appear to one skilled in the art to which this invention relates, and, therefore, I reserve the right to make such alterations or changes as shall fairly fall within the scope of the appended claims.

What I claim is:

1. In a device of the class described, the combination with a running board of an automobile, primary leaves engaging the running board, screws extending only through the central part of said leaves and securing the same to the running board, auxiliary leaves hingedly connected to the primary leaves, means on the auxiliary leaves adapted to engage said centrally-arranged screws for limiting the hinge movement of the auxiliary leaves, and a frame attached to the auxiliary leaves.

2. In a device of the class described, the combination with a running board of an automobile, of primary leaves engaging the edge of the running board, screws provided with heads extending through the primary leaves and into the running board, the heads projecting beyond the outer faces of said leaves, auxiliary leaves pivotally connected to the primary leaves, stop plates fastened to the auxiliary leaves and adapted to engage the projecting heads of said screws when the auxiliary leaves are moved outwardly to an excess, a frame positioned against the auxiliary leaves, said auxiliary leaves extending a comparatively long distance upon the frame for bracing the same, and means fastening the auxiliary leaves and frame together.

3. In a device of the class described, the combination with a running board of an automobile, of an inverted, substantially U-shaped frame positioned above the running board, hinges secured to the edge of the running board and also secured to the ends of the U-shaped frame, said hinges extending a considerable distance upon the ends of the frame and thereby bracing the same, stop plates secured against the outer faces of the hinges and being of sufficient resiliency to allow the frame to be slightly moved outwardly beyond its normal, vertical position, and rigid means extending through said hinges and beyond their outer faces and carried by the running board and adapted to have their outer projecting portions engaged by the lower ends of the stop plates when the frame is moved beyond its normal, vertical position.

In testimony whereof I hereunto affix my signature.

CAIN GODSEY.